US012240116B2

(12) United States Patent
Amo et al.

(10) Patent No.: US 12,240,116 B2
(45) Date of Patent: Mar. 4, 2025

(54) METHOD OF ADJUSTING MOTION PARAMETER, STORAGE MEDIUM, AND ROBOT SYSTEM

(71) Applicant: Seiko Epson Corporation, Tokyo (JP)

(72) Inventors: Shunsuke Amo, Shiojiri (JP); Kimitake Mizobe, Chino (JP)

(73) Assignee: SEIKO EPSON CORPORATION (JP)

( * ) Notice: Subject to any disclaimer, the term of this patent is extended or adjusted under 35 U.S.C. 154(b) by 416 days.

(21) Appl. No.: 17/588,622

(22) Filed: Jan. 31, 2022

(65) Prior Publication Data

US 2022/0241961 A1 Aug. 4, 2022

(30) Foreign Application Priority Data

Feb. 1, 2021 (JP) .................................. 2021-014204

(51) Int. Cl.
  *B25J 9/16* (2006.01)
  *B25J 9/04* (2006.01)
  *B25J 13/08* (2006.01)

(52) U.S. Cl.
  CPC ............. *B25J 9/163* (2013.01); *B25J 9/042* (2013.01); *B25J 9/1633* (2013.01); *B25J 9/1651* (2013.01); *B25J 9/1664* (2013.01); *B25J 13/085* (2013.01); *B25J 13/088* (2013.01)

(58) Field of Classification Search
  CPC .......... B25J 9/163; B25J 9/042; B25J 9/1633; B25J 9/1651; B25J 9/1664; B25J 13/085; B25J 13/088; B25J 9/1641; B25J 9/1653; B25J 9/1602; B25J 9/1628; G05B 2219/39195
  See application file for complete search history.

(56) References Cited

U.S. PATENT DOCUMENTS

| 2018/0207797 A1 | 7/2018 | Yamaoka et al. |
| 2019/0160664 A1* | 5/2019 | Nakagawa ............. B25J 9/1692 |
| 2019/0255709 A1 | 8/2019 | Inagaki et al. |

FOREIGN PATENT DOCUMENTS

| CN | 109849025 A | 6/2019 |
| CN | 110186553 A | 8/2019 |
| JP | H06-035535 A | 2/1994 |
| JP | 2018-118353 A | 8/2018 |

* cited by examiner

*Primary Examiner* — Adam R Mott
*Assistant Examiner* — Alyzia N Dilworth
(74) *Attorney, Agent, or Firm* — Harness, Dickey & Pierce, P.L.C.

(57) ABSTRACT

A method of adjusting a motion parameter includes a first information acquisition step of acquiring first information on a motion condition of a robot arm when a first motion parameter is set and the robot arm is controlled to perform a motion, a third information acquisition step of inputting the first information and second information on attributes of the robot to a vibration estimation model and acquiring output third information, and a second motion parameter acquisition step of acquiring a second motion parameter that shortens a working time using the first information, the second information, and the third information. The steps are repeatedly executed using the acquired second motion parameter as the first motion parameter and a target work motion parameter is acquired.

8 Claims, 5 Drawing Sheets

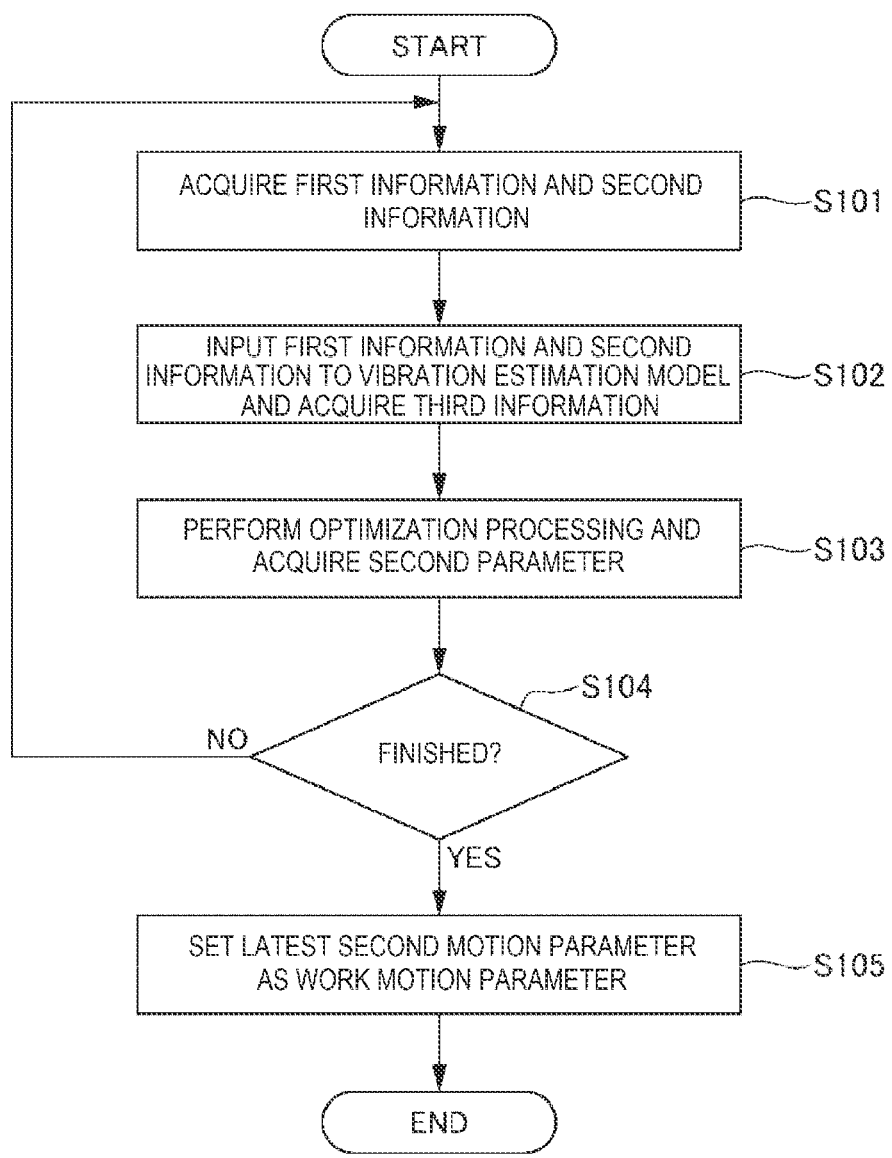

METHOD OF ADJUSTING MOTION PARAMETER, STORAGE MEDIUM, AND ROBOT SYSTEM

The present application is based on, and claims priority from JP Application Serial Number 2021-014204, filed Feb. 1, 2021, the disclosure of which is hereby incorporated by reference herein in its entirety.

BACKGROUND

1. Technical Field

The present disclosure relates to a method of adjusting a motion parameter, a storage medium, and a robot system.

2. Related Art

Recently, in factories, due to labor cost rise and labor shortage, work manually performed in the past has been increasingly automated by various robots. In order to control a robot to perform predetermined work, a motion condition, i.e., a motion parameter for the robot is set.

For example, in a control system for a robot disclosed in JP-A-2018-118353, a robot is moved and vibration is measured based on an information output by an acceleration sensor provided in the robot. Then, a motion parameter that reduces the vibration is acquired using machine learning.

However, in the method of related art, it is necessary to provide the acceleration sensor in the robot, and it is hard to set a proper motion parameter by a simple configuration.

SUMMARY

A method of adjusting a motion parameter according to an aspect of the present disclosure is a method of adjusting a motion parameter of adjusting a motion parameter of a motion executed by a robot having a robot arm, including a first information acquisition step of acquiring first information on a motion condition of the robot arm when a first motion parameter is set and the robot arm is controlled to perform the motion, a third information acquisition step of, to a vibration estimation model to which the first information and second information on attributes of the robot are input and from which third information on a vibration estimate value of the robot arm is output, inputting the first information and the second information, and acquiring the output third information, and a second motion parameter acquisition step of acquiring a second motion parameter that shortens a working time using the first information, the second information, and the third information, wherein the first information acquisition step, the third information acquisition step, and the second motion parameter acquisition step are repeatedly executed using the acquired second motion parameter as the first motion parameter and a target work motion parameter is acquired.

A non-transitory computer-readable storage medium according to an aspect of the present disclosure stores a motion parameter adjustment program for adjusting a motion parameter of a motion executed by a robot having a robot arm, the program executes a first information acquisition step of acquiring first information on a motion condition of the robot arm when a first motion parameter is set and the robot arm is controlled to perform the motion, a third information acquisition step of, to a vibration estimation model to which the first information and second information on attributes of the robot are input and from which third information on a vibration estimate value of the robot arm is output, inputting the first information and the second information, and acquiring the output third information, and a second motion parameter acquisition step of acquiring a second motion parameter that shortens a working time using the first information, the second information, and the third information, wherein the first information acquisition step, the third information acquisition step, and the second motion parameter acquisition step are repeatedly executed using the acquired second motion parameter as the first motion parameter and a target work motion parameter is acquired.

A robot system according to an aspect of the present disclosure is a robot system including a robot having a robot arm and a motion parameter adjustment apparatus that adjusts a motion parameter of a motion executed by the robot, and the motion parameter adjustment apparatus executes a first information acquisition step of acquiring first information on a motion condition of the robot arm when a first motion parameter is set and the robot arm is controlled to perform the motion, a third information acquisition step of, to a vibration estimation model to which the first information and second information on attributes of the robot are input and from which third information on a vibration estimate value of the robot arm is output, inputting the first information and the second information, and acquiring the output third information, and a second motion parameter acquisition step of acquiring a second motion parameter that shortens a working time using the first information, the second information, and the third information, wherein the first information acquisition step, the third information acquisition step, and the second motion parameter acquisition step are repeatedly executed using the acquired second motion parameter as the first motion parameter and a target work motion parameter is acquired.

BRIEF DESCRIPTION OF THE DRAWINGS

FIG. 5 is a flowchart showing an example of a control operation performed by the robot system shown in FIG. 1.

DESCRIPTION OF EXEMPLARY EMBODIMENTS

First Embodiment

Figure 1:
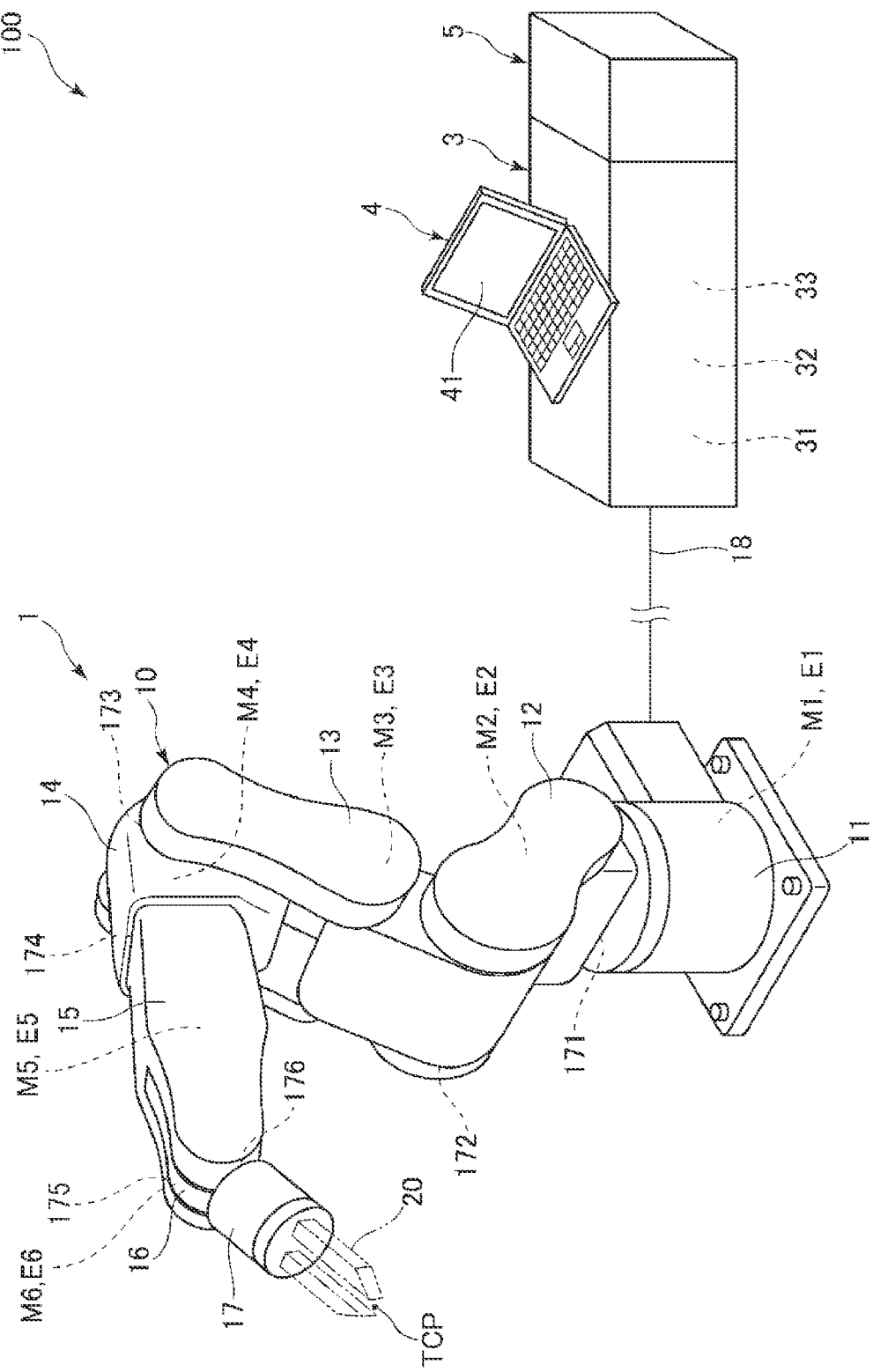
FIG. 1 shows an overall configuration of a robot system of a first embodiment.
Figure 2:
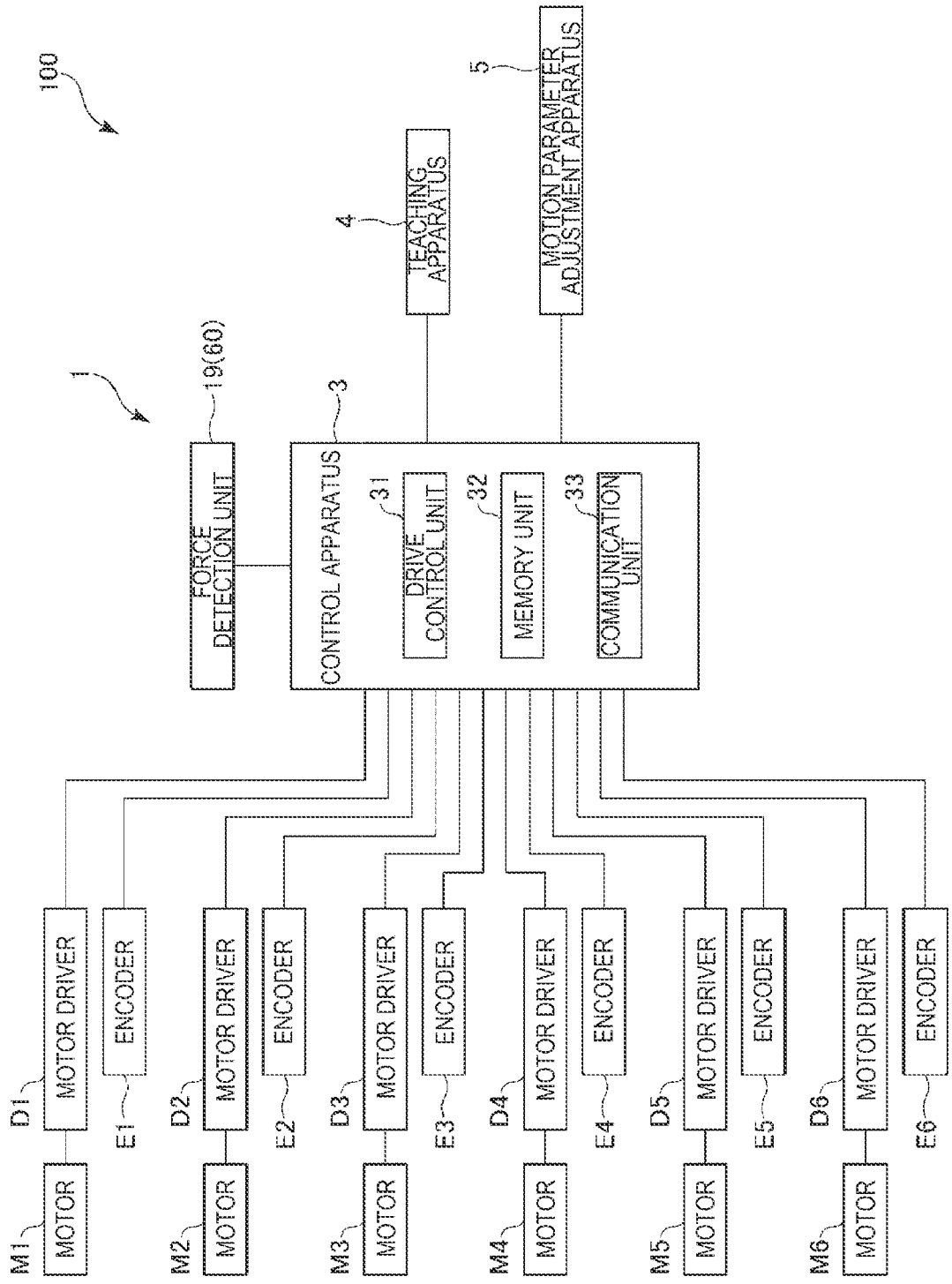
FIG. 2 is a block diagram of the robot system shown in FIG. 1.
Figure 3:
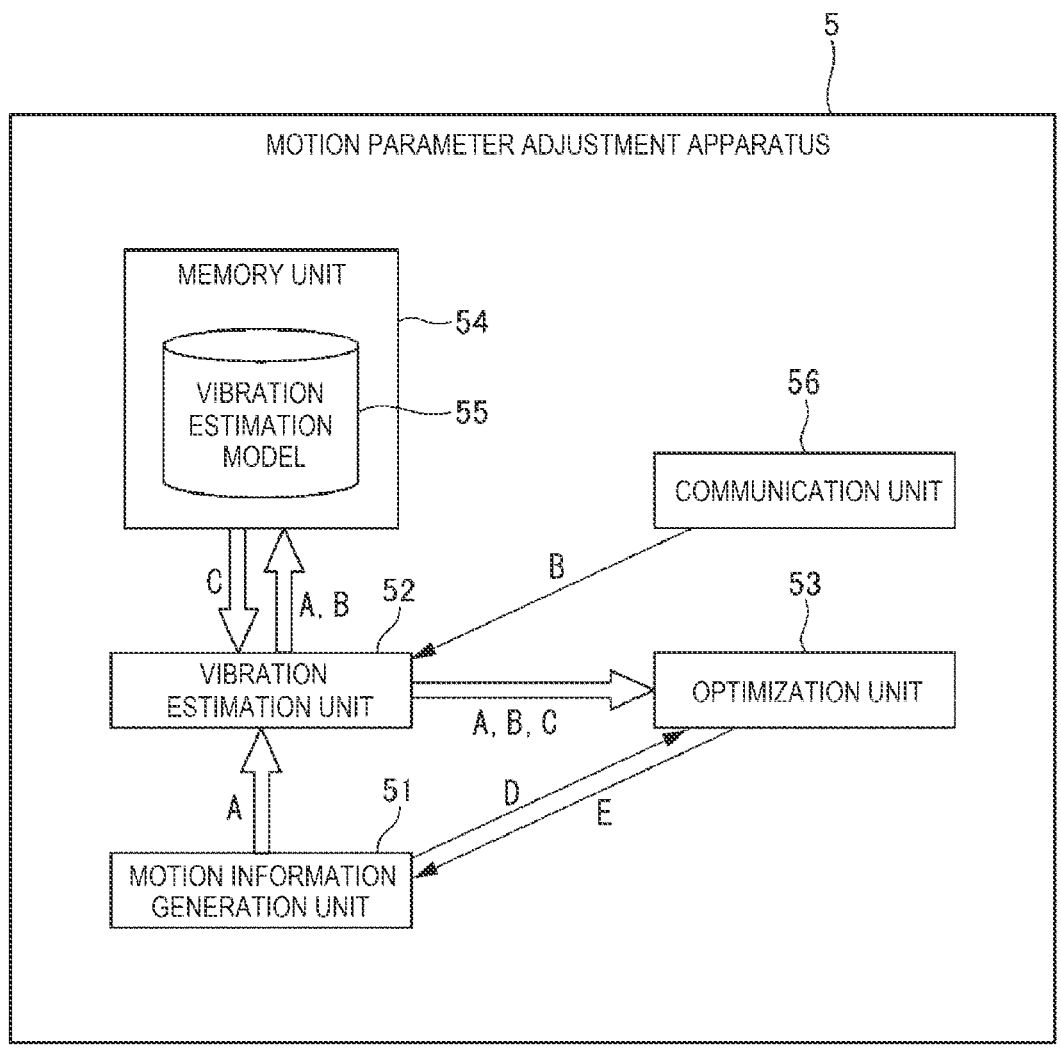
FIG. 3 is a block diagram of a motion parameter adjustment apparatus shown in FIG. 1.
Figure 4:
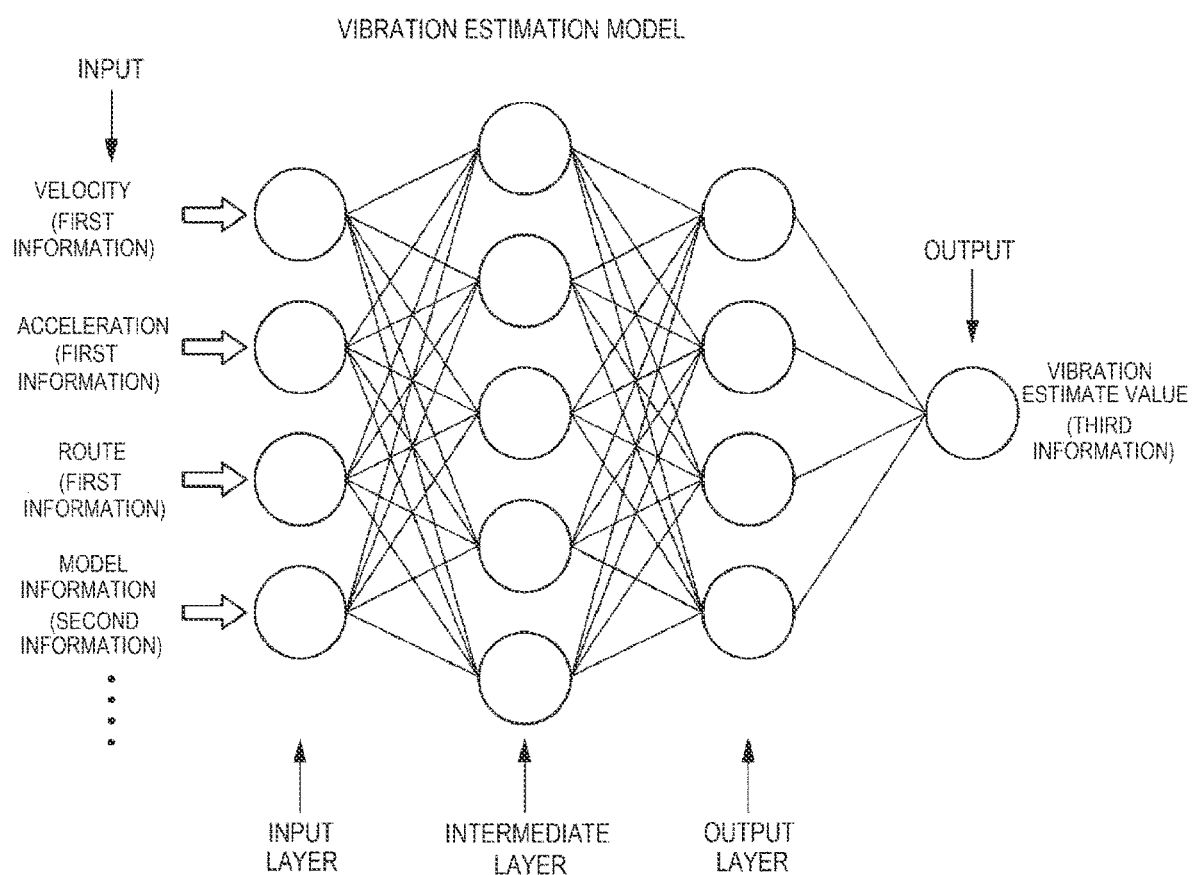
FIG. 4 shows an example of a configuration example of a vibration estimation model shown in FIG. 3 in a schematic diagram of a neural network.

FIG. 1 shows an overall configuration of a robot system of a first embodiment. FIG. 2 is a block diagram of the robot system shown in FIG. 1. FIG. 3 is a block diagram of a motion parameter adjustment apparatus shown in FIG. 1. FIG. 4 shows an example of a configuration example of a vibration estimation model shown in FIG. 3 in a schematic diagram of a neural network. FIG. 5 is a flowchart showing an example of a control operation performed by the robot system shown in FIG. 1.

As below, a method of adjusting a motion parameter, a motion parameter adjustment program, and a robot system according to the present disclosure will be explained in detail based on preferred embodiments shown in the accompanying drawings. Hereinafter, for convenience of explanation, regarding a robot arm, a base 11 side in FIG. 1 is also referred to as "proximal end" and the opposite side, i.e., an end effector 20 side is also referred to as "distal end".

As shown in FIG. 1, a robot system 100 includes a robot 1, a control apparatus 3 that controls the robot 1, a teaching apparatus 4, and a motion parameter adjustment apparatus 5.

First, the robot 1 is explained.

The robot 1 shown in FIG. 1 is a single-arm six-axis vertical articulated robot in the embodiment, and has a base 11 and a robot arm 10. Further, an end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that drivably supports the robot arm 10 from the downside and fixed to e.g. a floor within a factory. In the robot 1, the base 11 is electrically coupled to the control apparatus 3 via a relay cable. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side in this order. Note that the number of the arms of the robot arm 10 is not limited to six, but may be e.g. one, two, three, four, five, seven, or more. The sizes including the entire lengths of the respective arms are not particularly limited, but can be appropriately set.

The base 11 and the first arm 12 are coupled via a joint 171. Further, the first arm 12 is pivotable around a first pivot axis parallel to the vertical directions as a pivot center relative to the base 11. The first pivot axis is aligned with a normal of the floor to which the base 11 is fixed.

The first arm 12 and the second arm 13 are coupled via a joint 172. Further, the second arm 13 is pivotable around a second pivot axis parallel to the horizontal directions as a pivot center relative to the first arm 12. The second pivot axis is parallel to an axis orthogonal to the first pivot axis.

The second arm 13 and the third arm 14 are coupled via a joint 173. Further, the third arm 14 is pivotable around a third pivot axis parallel to the horizontal directions as a pivot center relative to the second arm 13. The third pivot axis is parallel to the second pivot axis.

The third arm 14 and the fourth arm 15 are coupled via a joint 174. Further, the fourth arm 15 is pivotable around a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable around a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable around a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drive units and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the fifth arm 16 and detects the position of the motor M5. The encoder E6 is provided inside of the sixth arm 17 and detects the position of the motor M6.

The encoders E1 to E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via a motor driver D1 to a motor driver D6 based on the information. That is, to control the robot arm 10 is to control the motor M1 to motor M6.

In the robot 1, a force detection unit 19 that detects a force is detachably placed in the robot arm 10. The robot arm 10 may be driven with the force detection unit 19 placed therein. The force detection unit 19 is a six-axis force sensor in the embodiment. As will be described later, the force detection unit 19 is a torque sensor that detects magnitude of forces on three detection axes orthogonal to one another and magnitude of torque around the three detection axes. The force detection unit 19 is not limited to the six-axis force sensor, but may have another configuration.

The end effector 20 may be detachably attached to the force detection unit 19. In the embodiment, the end effector 20 includes a hand having a pair of claws that can move closer to or away from each other and gripping and releasing a workpiece by the respective claws. Note that the end effector 20 is not limited to the illustrated configuration, but may be a hand gripping a workpiece by suction. Or, the end effector 20 may be a tool e.g. a polisher, a grinder, a cutter, a driver, a wrench, or the like.

Further, in a robot coordinate system, a tool center point TCP as a control point is set at the distal end of the end effector 20. In the robot system 100, the position of the tool center point TCP is acquired in the robot coordinate system in advance, and the tool center point TCP may be used as a reference for control.

Next, the control apparatus 3 and the teaching apparatus 4 will be explained.

As shown in FIG. 1, in the embodiment, the control apparatus 3 is placed in a position apart from the robot 1. The apparatus is not limited to the configuration, but may be provided inside of the base 11. Further, the control apparatus 3 has a function of controlling driving of the robot 1 and is electrically coupled to the above described respective parts of the robot 1. The control apparatus 3 has a control unit 31, a memory unit 32, and a communication unit 33. These respective units are communicably coupled to one another via e.g. a bus.

The control unit 31 includes e.g. a CPU (Central Processing Unit) and reads and executes various programs including a motion program stored in the memory unit 32. Signals generated in the control unit 31 are transmitted to the respective parts of the robot 1 via the communication unit 33. Thereby, the robot arm 10 may execute predetermined work on a predetermined condition. The memory unit 32 stores various programs etc. that can be executed by the control unit 31. The memory unit 32 includes e.g. a volatile memory such as a RAM (Random Access Memory), a nonvolatile memory such as a ROM (Read Only Memory), and a detachable external memory device. The communication unit 33 transmits and receives signals between the teaching apparatus 4 and the motion parameter adjustment apparatus 5 and itself using an external interface e.g. a wired LAN (Local Area Network) or a wireless LAN.

As shown in FIGS. 1 and 2, the teaching apparatus 4 has a display unit 41 and has a function of creating and inputting a motion program to the robot arm 10. The teaching apparatus 4 is not particularly limited, but includes e.g. a tablet, a personal computer, a smartphone, and a teaching pendant.

Next, the motion parameter adjustment apparatus 5 will be explained.

The motion parameter adjustment apparatus 5 shown in FIGS. 1 to 3 is an apparatus for setting a motion parameter of the robot arm 10. The motion parameter refers to a motion condition when the robot arm 10 moves and includes setting conditions e.g. a velocity of the tool center point TCP, an acceleration of the tool center point TCP, a route of the tool center point TCP, a force applied to the robot arm 10, and position gain or velocity gain of the motor M1 to motor M6. The velocity of the tool center point TCP, the acceleration of the tool center point TCP, and the route of the tool center point TCP are specified by temporal power distribution conditions to the motor M1 to motor M6.

Note that, as shown in FIG. 1, the motion parameter adjustment apparatus 5 may be formed separately from the control apparatus 3 or the teaching apparatus 4 or incorporated in the control apparatus 3 or the teaching apparatus 4. When the motion parameter adjustment apparatus 5 is formed separately from the control apparatus 3 or the teaching apparatus 4, for example, the motion parameter adjustment apparatus may be provided in a server on a network via a communication line e.g. Ethernet (registered trademark).

As shown in FIG. 3, the motion parameter adjustment apparatus 5 has a motion information generation unit 51, a vibration estimation unit 52, an optimization unit 53, a memory unit 54, and a communication unit 56. Note that, in FIG. 3, "A" shows first information, "B" shows second information, "C" shows third information, "D" shows working time, and "E" shows a second motion parameter.

The motion information generation unit 51 includes e.g. a CPU and reads and executes various programs including a motion parameter setting program stored in the memory unit 54. Specifically, the unit acquires first information on a motion condition when an evaluation operation is executed with the received motion parameter or the motion parameter read from the memory unit 54.

The first information includes information on a working time, information on position and attitude of the robot arm 10, information on the velocity of the tool center point TCP, information on the acceleration of the tool center point TCP, and work conditions such as a weight of a workpiece and a force applied to the robot arm 10. Note that it is preferable that the information generated by the motion information generation unit 51 is temporal information.

The motion information generation unit 51 may acquire the above described information by actually driving the robot arm 10 or acquire the above described information using a simulator.

The first information may be the same condition as the first motion parameter or different.

The vibration estimation unit 52 includes e.g. a CPU and reads and executes various programs including the motion parameter setting program stored in the memory unit 54. Specifically, the vibration estimation unit 52 inputs the first information received from the motion information generation unit 51 and second information on attributes of the robot 1 to a vibration estimation model 55 stored in the memory unit 54, and obtains third information as output from the vibration estimation model 55.

The second information is the information on attributes of the robot 1 including a model number, a serial number, a date of manufacture, a location of manufacture of the robot 1. That is, the second information is information for specifying the structure of the robot arm 10, the used elemental parts, the degree of deterioration, or the like. The elemental parts include a reducer, an encoder, a motor, a belt, a pulley, and a bearing.

The second information may be input by a worker using e.g. an input device (not shown), the teaching apparatus 4, or the like, or the second information stored in the control apparatus 3 or the teaching apparatus 4 may be read.

The third information is information on a vibration estimate value including e.g. the maximum amplitude of the vibration applied to the robot arm 10, average amplitude of the vibration applied to the robot arm 10, a settling time after the robot arm 10 stops until the vibration is settled, and time-series data of vibration.

The vibration estimation model 55 is generated by machine learning. To generate the vibration estimation model 55 by machine learning is to generate the vibration estimation model 55 while repeatedly learning from input data, finding features, tendencies, etc. read from the respective input data, and applying the results to new input data and predicting.

Specifically, the vibration estimation model 55 receives, evaluates, and judges an input value and outputs the results as an output value. The input value refers to the first information and the second information and the output value refers to the vibration estimate value of the robot arm 10.

The vibration estimation model 55 is generated by a vibration model generation unit (not shown) and may be constructed using e.g. the neural network as shown in FIG. 4. Specifically, the vibration model generation unit may be formed to have an input layer, an intermediate layer, and an output layer. The respective information connects to information of the adjacent layers via networks and a larger network is developed. The intermediate layer has a single layer in the illustrated configuration, but preferably has a plurality of layers. Thereby, in the respective layers of the intermediate layer, importance of information may be weighted and a more accurate vibration estimate value may be output.

As the neural network, a recurrent neural network may be applied. In the recurrent neural network, time-series information is recursively held, and the network may be regarded as a general neural network by development along the time axis. Further, both the intermediate layer at the previous time and the input at this time are used for learning, and thereby, a network structure in consideration of the time-series information may be obtained.

A learning method in the vibration model generation unit includes supervised learning, unsupervised learning, and a combination thereof. In a case of the supervised learning, a large number of data sets of the input value and the output value are prepared and provided to the vibration model generation unit, and thereby, the features in those data sets may be learned and a model for estimation of a result from input, i.e., a relationship thereof may be inductively gained. In a case of unsupervised learning, learning is performed to reflect the output value or a pass/fail result thereof on the input value. Therefore, even when information on an accurate value of the vibration estimate value is not provided, an abnormality may be sensed from the deviation of the reconstructed output from the input. As a result, the vibration estimate value may be clearly sensed. In the recurrent neural network, unlike an ordinary neural network, an error is propagated to travel backward in time, and learning is performed using a back propagation through time (BPTT) method.

The optimization unit 53 includes e.g. a CPU and reads and executes various programs including the motion parameter setting program stored in the memory unit 54. Specifically, the optimization unit 53 receives information on the working time from the motion information generation unit 51 and receives the first information, the second information, and the third information from the vibration estimation unit 52.

For example, the optimization unit 53 uses an optimization algorithm with the working time as an objective function and the vibration estimate value as a constraint condition and searches for a motion parameter that minimizes the objective function. Thereby, the motion parameter that may reduce the vibration while shortening the working time is obtained. The optimization algorithm is not particularly limited to, but includes e.g. Genetic Algorithms, Differential Evolution, Particle Swarm Optimization, and Estimation of Distribution Algorithm.

The optimization unit 53 acquires the more preferable motion parameters, i.e., the setting conditions including the velocity of the tool center point TCP, the acceleration of the tool center point TCP, the route of the tool center point TCP, and position gain or velocity gain of the motor M1 to motor M6, and transmits information of the more preferable motion parameters to the motion information generation unit 51.

Then, the above described process is repeated, and thereby, the more proper motion parameters may be acquired. Note that, of these motion parameters, the most preferable motion parameter is set as a work motion parameter, the information of the work motion parameter is transmitted to the control apparatus 3 or the teaching apparatus 4 via the communication unit 56, and work is performed.

For example, motion parameters acquired at a plurality of times may be compared and the optimum motion parameter may be set as the work motion parameter, or the motion parameter acquired at the last time may be set as the work motion parameter. This will be described later in detail.

The memory unit 54 includes e.g. a volatile memory such as a RAM (Random Access Memory), a nonvolatile memory such as a ROM (Read Only Memory), and a detachable external memory device. In the memory unit 54, various programs including the motion parameter setting program and the vibration estimation model 55 are stored. Further, a target work motion parameter etc. are stored.

The communication unit 56 transmits and receives signals between the control apparatus 3 and the teaching apparatus 4 and itself using an external interface e.g. a wired LAN (Local Area Network) or a wireless LAN.

Next, an example of control operation performed by the robot system 100 will be explained based on a flowchart shown in FIG. 5.

First, at step S101, the first information and the second information are acquired. That is, the vibration estimation unit 52 receives the first information from the motion information generation unit 51 and receives the second information from the communication unit 56.

Specifically, the motion information generation unit 51 acquires the first information when the first motion parameter as an arbitrary initial motion parameter is set and the robot arm 10 is controlled to perform an arbitrary motion, and transmits the first information to the vibration estimation unit 52. Further, for example, the communication unit 56 transmits the second information on the attributes of the robot 1 input by the worker using an input device (not shown) to the vibration estimation unit 52. The first motion parameter is set in advance and the information thereof is stored in the memory unit 54.

The step S101 is a first information acquisition step of acquiring the first information.

Then, at step S102, the vibration estimation unit 52 inputs the first information and the second information to the vibration estimate model 55, and acquires the third information. Then, the vibration estimation unit 52 transmits the first information, the second information, and the third information to the optimization unit 53. That is, the vibration estimation unit 52 transmits the input information and the output information to the optimization unit 53.

The step S102 is a third information acquisition step of acquiring the third information.

Then, at step S103, the optimization unit 53 performs optimization processing and acquires the second motion parameter. In this regard, the optimization unit 53 uses the working time as an objective function and obtains a motion parameter that minimizes the objective function and reduces the vibration. The motion parameter obtained at this step is called the second motion parameter. In this manner, at the step, the second motion parameter that makes the working time shorter than that of the first motion parameter used at step S101 is obtained.

The step S103 is a second motion parameter acquisition step of acquiring the second motion parameter.

Then, at step S104, whether or not to finish the process is determined. That is, whether or not the second motion parameter obtained at step S103 is set as the target work motion parameter is determined. For the determination at this step, a determination method A or a determination method B, which will be described later, may be used.

At step S104, when a determination not to finish the process is made, the process returns to step S101, and first information when the robot arm 10 is controlled to perform an arbitrary motion using the second motion parameter acquired at step S103 not using the first motion parameter is obtained. Then, step S102 and step S103 are performed.

In the above described manner, step S101, step S102, and step S103 are repeatedly executed using the second motion parameter acquired at step S103 as the first motion parameter at step S101 until a determination to finish the process is made at step S104. Then, at step S104, when the determination to finish the process is made, at step S105, the latest second motion parameter is set as the work motion parameter. That is, the latest second motion parameter is stored as the work motion parameter in the memory unit 54.

Here, the determination method A and the determination method B are explained.

The determination method A is a method of repeatedly executing step S101 to step S103 at a predetermined number of times. At step S104, when the number of times of the repeated execution reaches a predetermined number, the determination to finish the process is made. Then, the latest second motion parameter, i.e., the second motion parameter acquired at the last time is set as the work motion parameter.

As described above, the method of adjusting the motion parameter repeatedly executes step S102 as the third information acquisition step and the second motion parameter acquisition step at the predetermined number of times, and sets the second motion parameter acquired at the last time as the work motion parameter. Thereby, the work motion parameter that takes any more time than necessary for the processing and makes the working time is shorter may be set.

The determination method B is a method of repeatedly executing step S101 to step S103 and, when convergence of the second motion parameter is determined, determining to finish the process. That is, the second motion parameter acquired at the nth time is compared with the second motion parameter acquired at the (n−1)th time, when the degree of deviation is within a predetermined range, the determination to finish the process is made at the nth step S104.

Note that "the degree of deviation is within a predetermined range" means that, when one of the respective elements of the motion parameter, i.e., the setting conditions including the velocity of the tool center point TCP, the acceleration of the tool center point TCP, the route of the tool center point TCP, and the position gain or velocity gain of the motor M1 to motor M6 is compared with previous one, the difference is within a predetermined range.

As described above, the third information acquisition step and the second motion parameter acquisition step are repeatedly executed at the predetermined number of times and, when the acquired second motion parameter converges, the second motion parameter acquired at the last time is set as the work motion parameter. Thereby, the more proper work motion parameter with the shorter working time may be set.

Through the step S101 to step S105, the proper work motion parameter may be set. Then, work is performed using the work motion parameter, and thereby, prompt work may be executed.

As described above, the method of adjusting the motion parameter according to the present disclosure is the method of adjusting the motion parameter of adjusting the motion parameter of the motion executed by the robot 1 having the robot arm 10. Further, the method of adjusting the motion parameter has the first information acquisition step of acquiring the first information on the motion condition of the robot arm 10 when the first motion parameter is set and the robot arm 10 is controlled to perform the motion, the third information acquisition step of, to the vibration estimation model 55 to which the first information and the second information on the attributes of the robot 1 are input and from which the third information on the vibration estimate value of the robot arm 10 is output, inputting the first information and the second information, and acquiring the output third information, and the second motion parameter acquisition step of acquiring the second motion parameter that shortens the working time using the first information, the second information, and the third information. The first information acquisition step, the third information acquisition step, and the second motion parameter acquisition step are repeatedly executed using the acquired second motion parameter as the first motion parameter and the target work motion parameter is acquired. According to the method, even when a vibration measuring instrument that detects vibration is not provided in the robot 1, information on vibration may be acquired and a proper motion parameter may be set based thereon.

The first motion parameter includes at least one of the velocity of the tool center point TCP as the control point of the robot arm 10, the acceleration of the tool center point TCP as the control point of the robot arm 10, and the force applied to the robot arm 10. Thereby, accurate and various first information may be acquired and the working time may be accurately acquired.

The first information includes the information on the velocity of the tool center point TCP as the control point of the robot arm 10 or the information on the acceleration of the tool center point TCP. The first information is input to the vibration estimation model 55, and thereby, the more accurate third information may be acquired.

The third information includes the maximum amplitude of the vibration generated when the robot arm 10 is driven and the settling time. Thereby, the accurate vibration estimate value may be acquired and the more proper work motion parameter may be acquired.

The motion parameter adjustment program according to the present disclosure is the motion parameter adjustment program for adjusting the motion parameter of the motion executed by the robot 1 having the robot arm 10. Further, the motion parameter adjustment program is for executing the first information acquisition step of acquiring the first information on the motion condition of the robot arm 10 when the first motion parameter is set and the robot arm 10 is controlled to perform the motion, the third information acquisition step of, to the vibration estimation model 55 to which the first information and the second information on the attributes of the robot 1 are input and from which the third information on the vibration estimate value of the robot arm 10 is output, inputting the first information and the second information, and acquiring the output third information, and the second motion parameter acquisition step of acquiring the second motion parameter that shortens the working time using the first information, the second information, and the third information. The first information acquisition step, the third information acquisition step, and the second motion parameter acquisition step are repeatedly executed using the acquired second motion parameter as the first motion parameter, and the target work motion parameter is acquired. The program is executed, and thereby, even when a vibration measuring instrument that detects vibration is not provided in the robot 1, information on vibration may be acquired and a proper motion parameter may be set based thereon.

Note that the motion parameter adjustment program according to the present disclosure may be stored in the memory unit 54, stored in a recording medium e.g. a CD-ROM, or stored in a memory device connectable via a network or the like.

The robot system 100 according to the present disclosure includes the robot 1 having the robot arm 10 and the motion parameter adjustment apparatus 5 that adjusts the motion parameter of the motion executed by the robot 1. The motion parameter adjustment apparatus 5 executes the first information acquisition step of acquiring the first information on the motion condition of the robot arm 10 when the first motion parameter is set and the robot arm 10 is controlled to perform the motion, the third information acquisition step of, to the vibration estimation model 55 to which the first information and the second information on the attributes of the robot 1 are input and from which the third information on the vibration estimate value of the robot arm 10 is output, inputting the first information and the second information, and acquiring the output third information, and the second motion parameter acquisition step of acquiring the second motion parameter that shortens the working time using the first information, the second information, and the third information. The first information acquisition step, the third information acquisition step, and the second motion parameter acquisition step are repeatedly executed using the acquired second motion parameter as the first motion parameter, and the target work motion parameter is acquired. According to the robot system 100, even when a vibration measuring instrument that detects vibration is not provided in the robot 1, information on vibration may be acquired and a proper motion parameter may be set based thereon.

As above, the method of adjusting the motion parameter, the motion parameter adjustment program, and the robot system according to the present disclosure are explained with respect to the illustrated embodiments, however, the present disclosure is not limited to the embodiments. The respective steps and parts of the method of adjusting the motion parameter, the motion parameter adjustment program, and the robot system may be replaced by arbitrary steps and structures that may exert the same functions. Further, an arbitrary step or structure may be added thereto.

What is claimed is:

1. A method of adjusting a motion parameter of a motion executed by a robot having a robot arm, comprising:
   a first information acquisition step of acquiring first information on a motion condition of the robot arm when a first motion parameter is set and the robot arm is controlled to perform the motion by a motor;
   a third information acquisition step of, to a vibration estimation model to which the first information and second information on attributes of the robot are input and from which third information on a vibration estimate value of the robot arm is output, inputting the first information and the second information, and acquiring the output third information; and
   a second motion parameter acquisition step of acquiring a second motion parameter that shortens a working time using the first information, the second information, and the third information, wherein
   the first information acquisition step, the third information acquisition step, and the second motion parameter acquisition step are repeatedly executed using the acquired second motion parameter as the first motion parameter and a target work motion parameter is acquired,
   each of the first, second, and target work motion parameters includes a velocity of the robot arm, an acceleration of the robot arm, a route of the robot arm, a force applied to the robot arm, and a position gain or a velocity gain of the motor,
   the first information includes information on a working time, information on a position and an attitude of the robot arm, information on the velocity the robot arm, information on the acceleration of the robot arm, and work condition including a weight of a workpiece held by the robot arm and the force applied to the robot arm,
   the second information includes information on attributes of the robot including a model number and a serial number, and
   the third information includes information on the vibration estimate value, and the vibration estimate value includes a maximum amplitude of a vibration applied to the robot arm, an average amplitude of the vibration robot arm, a settling time after the robot arm stops until the vibration is settled, and time-series data of the vibration.

2. The method of adjusting the motion parameter according to claim 1, wherein
   the first motion parameter includes the velocity of a control point of the robot arm and the acceleration of the control point of the robot arm.

3. The method of adjusting the motion parameter according to claim 1, wherein
   the first information includes the information on the velocity of a control point of the robot arm and the information on the acceleration of the control point of the robot arm.

4. The method of adjusting the motion parameter according to claim 1, wherein
   the third information includes the maximum amplitude of the vibration generated when the robot arm is driven.

5. The method of adjusting the motion parameter according to claim 1, wherein
   the third information acquisition step and the second motion parameter acquisition step are repeatedly executed at a predetermined number of times, and the second motion parameter acquired at a last time is set as the work motion parameter.

6. The method of adjusting the motion parameter according to claim 1, wherein
   the third information acquisition step and the second motion parameter acquisition step are repeatedly executed at a predetermined number of times, and
   when the acquired second motion parameter converges, the second motion parameter acquired at a last time is set as the work motion parameter.

7. A non-transitory computer-readable storage medium storing a motion parameter adjustment program for adjusting a motion parameter of a motion executed by a robot having a robot arm and for causing a computer to execute a process by a processor so as to perform:
   a first information acquisition step of acquiring first information on a motion condition of the robot arm when a first motion parameter is set and the robot arm is controlled to perform the motion by a motor;
   a third information acquisition step of, to a vibration estimation model to which the first information and second information on attributes of the robot are input and from which third information on a vibration estimate value of the robot arm is output, inputting the first information and the second information, and acquiring the output third information; and
   a second motion parameter acquisition step of acquiring a second motion parameter that shortens a working time using the first information, the second information, and the third information, wherein
   the first information acquisition step, the third information acquisition step, and the second motion parameter acquisition step are repeatedly executed using the acquired second motion parameter as the first motion parameter and a target work motion parameter is acquired,
   each of the first, second, and target work motion parameters includes a velocity of the robot arm, an acceleration of the robot arm, a route of the robot arm, a force applied to the robot arm, and a position gain or a velocity gain of the motor, the first information includes information on a working time, information on a position and an altitude of the robot arm, information on the velocity of the robot arm, information on the acceleration of the robot arm, and work conditions including a weight of a workpiece held by the robot arm and the force applied to the robot arm, the second information includes information on attributes of the robot including a model number and a serial number, and the third information includes information on the vibration estimate value, and the vibration estimate value includes a maximum amplitude of a vibration applied to the robot arm, an average amplitude of the vibration applied to the robot arm, a settling time after the robot arm stops until the vibration is settled, and time-series data of the vibration.

8. A robot system comprising:

a robot having a robot arm; and a motion parameter adjustment apparatus that adjusts a motion parameter of a motion executed by the robot, the motion parameter adjustment apparatus including:

a memory configured to store a program; and a processor configured to execute the program so as to perform:

a first information acquisition step of acquiring first information on a motion condition of the robot arm when a first motion parameter is set and the robot arm is controlled to perform the motion by a motor;

a third information acquisition step of, to a vibration estimation model to which the first information and second information on attributes of the robot are input and from which third information on a vibration estimate value of the robot arm is output, inputting the first information and the second information, and acquiring the output third information; and a second motion parameter acquisition step of acquiring a second motion parameter that shortens a working time using the first information, the second information, and the third information, wherein the first information acquisition step, the third information acquisition step, and the second motion parameter acquisition step are repeatedly executed using the acquired second motion parameter as the first motion parameter and a target work motion parameter is acquired, each of the first, second, and target work motion parameters includes a velocity of the robot arm, an acceleration of the robot arm, a route of the robot arm, a force applied to the robot arm, and a position gain or a velocity gain of the motor, the first information includes information on a working time, information on a position and an attitude of the robot arm, information on the velocity of the robot arm, information on the acceleration of the robot arm, and work conditions including a weight of a workpiece held by the robot arm and the force applied to the robot arm, the second information includes information on attributes of the robot including a model number and a serial number, and the third information includes information on the vibration estimate value, and the vibration estimate value includes a maximum amplitude of a vibration applied to the robot arm, an average amplitude of the vibration applied to the robot arm, a settling time after the robot arm stops until the vibration is settled, and time-series data of the vibration.

\* \* \* \* \*